United States Patent Office 3,528,291
Patented Sept. 15, 1970

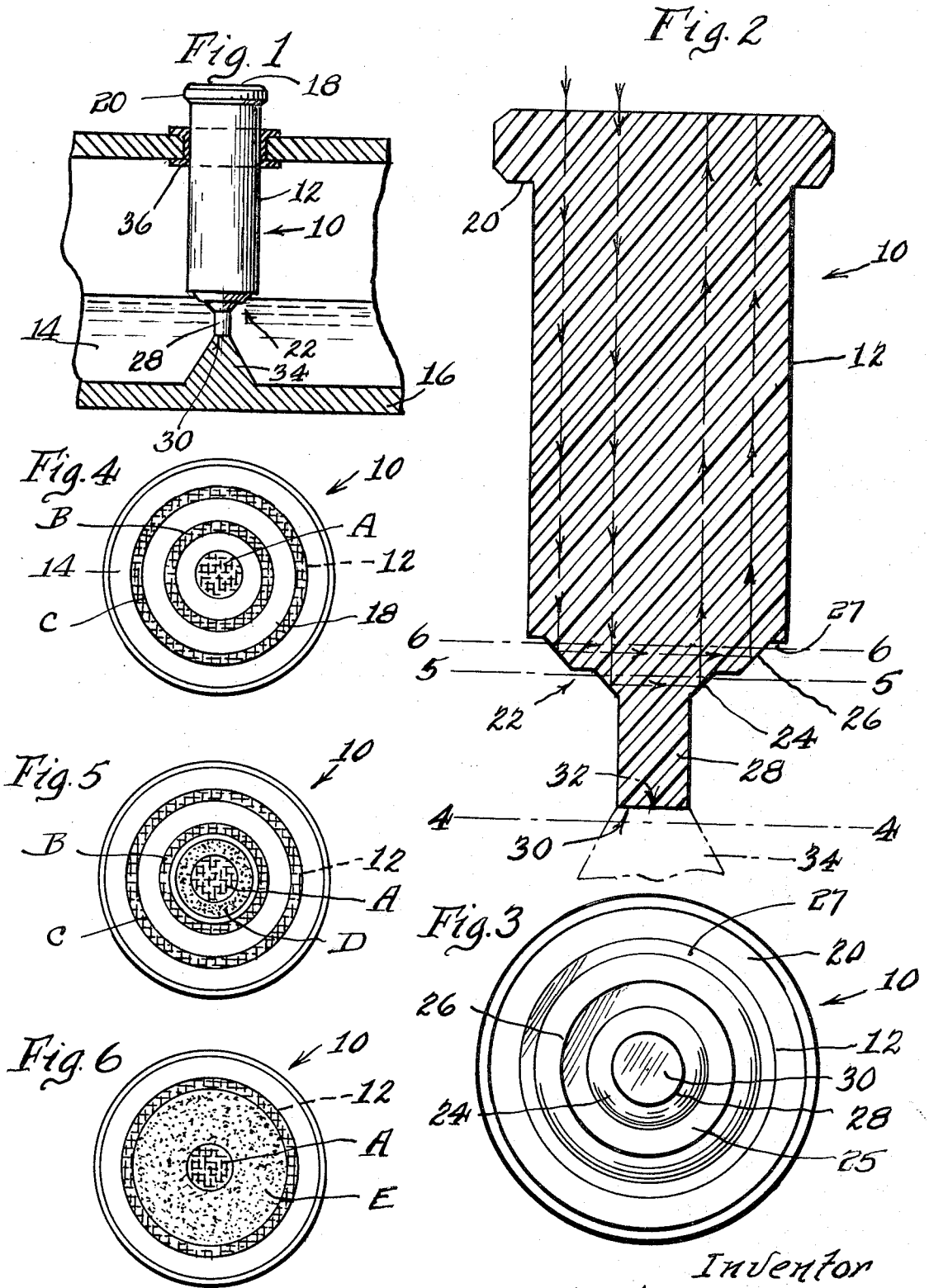

3,528,291
LIQUID LEVEL INDICATOR
Robert R. Melone, Des Plaines, Ill., assignor to Illinois Tool Works Inc., Chicago, Ill., a corporation of Delaware
Filed Apr. 25, 1969, Ser. No. 819,182
Int. Cl. G01f 23/02
U.S. Cl. 73—327
6 Claims

ABSTRACT OF THE DISCLOSURE

An optical liquid level indicator having a body of light transmitting material provided with a plurality of prismatic surfaces at the lower end for immersion within a liquid and an upper portion provided with an exposed liquid level indicating surface. The lower end of the body is provided with an extension for positioning the body relative to the surface of an associated container.

---

The present invention generally to optical indicators for indicating levels of liquid subject to fluctuation within a container, and more particularly to liquid level indicators of the type employing a body of light transmitting material having a lower portion immersible within liquid and an upper portion provided with an exposed liquid level indicating surface. The embodiment of the invention disclosed in the present application includes prismatic surfaces associated with the lower body portion receiving light rays from and reflecting light rays to the level indicating surface. The prismatic surfaces are so disposed with respect to the level indicating surfaces as to receive and reflect light on only that portion of the prismatic surface located above the level of an associated body of liquid. The above structure is disclosed in association with an abutment means or extension at the lower end of the body providing a restricted surface area for contacting a complementary interior surface area of an associated container whereby the body is accurately positioned relative to the container so that the prismatic surfaces will accurately indicate upper and lower limits of liquid levels between which it is desired to control the level of liquid within the container. Additionally the extension counteracts the impairment of readout conditions on the indicating surfaces which might otherwise result from surface tension of the contained liquid.

Thus, it is an object of the present invention to provide a new and improved optical indicator device of the type referred to above which is structurally arranged to assure efficient functioning of the indicator for its intended purpose when immersed within a body of liquid having a relatively high degree of surface tension.

More specifically, the present invention contemplates the provision of an optical-type liquid level indicator as set forth above having integral means adapted to accurately position the indicator relative to the container within which it is associated.

It is a further object of the present invention to provide an improved optical liquid level indicator of extremely simple construction, as for example in the form of a member of circular cross section, having an integral cylindrical extension at one end to serve as the positioning means, the cylindrical extension additionally preventing malfunction due to surface tension such as would occur in the absence of the cylindrical extension all with the view of avoiding impairment of readout conditions.

Another object of the present invention is to provide an improved optical-type liquid level indicator which is particularly adapted for use in association with the liquid fuel receptacles of carburetors and is provided with an optical "bullseye" pattern which aids in the adjustment of the liquid level in the fuel receptacle between upper and lower control limits.

The foregoing and other objects and advantages will be more apparent from the following detailed description when considered in connection with the accompanying drawing, wherein:

FIG. 1 is a fragmentary vertical sectional view of a carburetor equipped with a liquid level indicator shown in elevation which is representative of one embodiment of the present invention;

FIG. 2 is an enlarged central vertical sectional view of the indicator shown in FIG. 1;

FIG. 3 is a bottom view of the liquid level indicator illustrated in FIG. 2;

FIG. 4 is a view of the top of the indicator when the level of the liquid, as illustrated by the line 4—4 of FIG. 2, is below the lower extremity of the indicator;

FIG. 5 is a view similar to FIG. 4, when the level of the liquid in the associated container is as indicated by the line 5—5 of FIG. 2; and FIG. 6 is a view similar to FIGS. 4 and 5, when the level of the liquid as indicated by the line 6—6 of FIG. 2.

Referring now to the drawing more in detail, wherein like numerals have been employed to designate similar parts throughout the various figures, it will be seen that an indicator device which is representative of one embodiment of the present invention is designated generally by the numeral 10. The liquid level indicator 10 is formed of suitable light transmitting material. In the disclosed embodiment, the indicator 10 consists of a solid cylindrical body section 12, the lower portion of which is immersible within liquid fuel 14 of a container 16. For the purpose of illustrating one practical application of the present invention, the container 16 represents the liquid fuel receptacle of a conventional carburetor.

One of the most vexing problems which confront a mechanic is the adjustment of the means for controlling the level of fuel within a carburetor receptacle. Presently, this requires the removal of the top of the carburetor to provide access to the interior of the receptacle so that the mechanic can manually measure with a ruler the distance from the upper flange of the receptacle downwardly to the float mechanism which rides on the upper surface of the fuel, and controls a needle valve which introduces the fuel into the receptacle. The selection of the fuel level and the maintenance of the level is a critical adjustment and the tolerances are reasonably tight. Similarly, on new automobiles the dealers have difficulty in analyzing certain problems when the automobiles are returned under warranty conditions. This level of fuel in the carburetor is probably one of the more common adjustments contemplated under the warranty situation. Presently, as indicated above, the carburetor is disassembled, checked, rebuilt and adjusted, all of which is a time-consuming and costly operation as part of the warranty procedure. The present invention will obviate most of these problems since by observing the indicator, an immediate and accurate determination can be made as to the fuel level within the carburetor receptacle and adjustments can then be made to the carburetor float mechanism by means which are not a part of the present invention.

The upper portion of the indicator 10 provides an exposed liquid level indicating surface 18 and an annular flange 20. The lower portion of the indicator 10 is provided with prismatic surface means designated generally by the numeral 22 for receiving light rays from and reflecting light rays to the above mentioned level indicating surface 18. It will be noted that the prismatic surface means consists of axially and radially spaced annular frusto-conical surfaces 24 and 26. Included angle of each of said annular surfaces 24 and 26 is 90°. Thus, the annular surfaces 24 and 26 are inclined at 45° with respect to the exposed liquid level indicating surface 18. The surfaces 24 and 26 are separated by a flat annular surface 25 which is disposed perpendicularly to the axis of the indicator 10 and parallel to the indicating surface 18. A similar annular ring-like surface 27 radially separates the frusto-conical surface 26 from the outer margin of the body section 12.

Particular attention is directed to the lower extremity of the indicator 10 which is provided with a cylindrical tip or extension 28, presenting a flat surface 30, parallel to the indicating surface 18, which rests upon the complementary surface 32 of the container 16. This surface 32 is preferably formed along the upper terminus of a protuberance 34 formed integral with and extending upwardly from the lower wall of the carburetor receptacle or container. The indicator is mounted within the upper wall of the container by means of a grommet 36 which seals the aperture in the upper wall adapted to accept the body section 12. The indicator is telescoped through the grommet 36 until the flat surface 30 of the cylindrical extension 28 is brought into contact with the surface 32 of the projection 34. The purpose of maintaining the contact between surface 30 and surface 32 is to accurately position the prismatic surfaces relative to the receptacle so as to provide means for indicating control limits which will visually indicate to a mechanic the volume of liquid present in the receptacle. An alternate arrangement would be to extend the cylindrical tip 28 so that it would contact the lower surface of receptacle 16 thereby eliminating the necessity of the projection 34. The original embodiment is preferable, however, since the extension of cylindrical tip 28 generally is a more fragile arrangement than that shown.

Experience has shown that when the lower frusto-conical surface 24 is continued to a full cone shape and brought to rest on an abutment surface 30 that capillary action, due to the surface tension characteristics of the liquid fuel 14, has a tendency to cause a film of the liquid fuel to adhere to the surface 24 even though the level of the liquid has fallen below said surface. Provision of the extension 28 and the separation of the frusto-conical surface 24 from the abutment 34 eliminates this situation. Assuming that the dot-and-dash line 4, FIG. 2, indicates the level of the liquid fuel in the carburetor receptacle 16, the upper exposed indicating surface 18, when viewed from the top, will appear or readout as indicated in FIG. 4. The color and polish of the metallic surface 32 of the protuberance 34 will determine the shade and color of the central circular portion indicated by the letter A, FIG. 4. This portion A has been indicated as having a yellow or golden shade with the assumption that the surface 32 might normally constitute a polish brass area. Obviously other shades and colors could be used which would cause the area A to have a shade or color visually distinguishable from the remaining portion of the surface 18. Thus in FIG. 4, the area A would have a distinguishing shade or color from the bright or annular surface area located radially outwardly from the area A as defined by the annular surfaces 24 and 26. The planar surfaces 25 and 27 would also provide a shaded area B and C respectively different from that provided by the surfaces 24 and 26 which appear as bright annular rings when they are not immersed in a liquid. Thus, the dark annular rings B and C along with the dark center portion, which for illustrative purposes have been indicated as having a yellow or golden shade, form a "bulleye" pattern which readily provides mechanic with the allowable liquid level variations or tolerances which are permitted within the carburetor receptacle. Thus, the nominal level or control point can be established by the surface 25 which is represented by the shaded ring B. The upper control limit on the positive side is defined by the flat annular surface 27 illustrated as the shaded ring C in FIG. 4, while the lower control limit or the minus side of the control band is defined by the juncture of the frusto-conical surface 24 with the cylindrical extension 28 as illustrated by the circle A in FIG. 4. Each of these points can be critically determined and established by a fixed axial relationship within the receptacle 16 and defined by the axial spacing of the surfaces 24 and 26 with respect to the axial length of extension 28 and its contact with the protuberance 34. Thus, the surface of the liquid within the receptacle can be controlled between the upper and lower control limits merely by observing the indicating surface 18.

Assume that the dot-and-dash line 5—5 of FIG. 2 indicates the level of the fuel in the carburetor receptacle 16, the level indicating surface 18 will now appear as shown in FIG. 5. The central portion A will remain substantially the same color or shade as central area A described in connection with FIG. 4. Surrounding the central area A will be a darkened annular area D due to the immersion of the annular surface 24 within the liquid fuel. The darkened rings B and C will still be visible and the mechanic would interpret this reading as meaning that the level of the fuel in the receptacle was between the lower control limit and the nominal level. If the dot-and-dash line 6—6 of FIG. 2 indicates the level of the liquid fuel within the carburetor receptacle 16, the indicating surface 18 will appear as shown in FIG. 6. The central area A will remain substantially the same as that shown in FIGS. 4 and 5 and a darkened annular area E of FIG. 6 will appear which is considerably larger than the previously mentioned annular area D of FIG. 5. In this particular situation the annular area E will obliterate the darkened ring B and will extend out to adjacent the darkened ring C. This reading to a mechanic would indicate that he is on the high side of the nominal level and is approaching the upper control limit as defined by the darkened rings C. If the level of the fuel within the carburetor rises to a point above the flat annular surface 27, the annular darkened area of the level indicating surface will extend to the outer dimensional limits of the body section 12 and would obliterate the darkened ring C. Thus, the adjustment would have to be changed and the fuel level lowered so that the upper control limit defined by the darkened ring C is visible. It will be noted that the darkened areas D and E are indicated by stipling to distinguish from the color identification of the central area A and the darkened ring B and C. This is done for the purpose of clarifying the function of this device only since in practice they probably would be indistinguishable and blend together as the level of the fuel fluctuated.

Thus, the provision of the annular frusto-conical surfaces 24 and 26 and a separated condition both axially and radially provides a "bullseye" readout on the indicating surface 18 as well as reducing the overall axial extent of the prismatic surface means 22 as a unit and permits the close tolerance variations required by the fuel level of the carburetor. The provision of the axial extension 28 eliminates the capillary action resulting from surface tension characteristics of the fuel and prevents the adherence to the surface 24 which would give an undesirable readout condition. The flange 20 provides a finger grip means for quick removal of the indicator from the carburetor receptacle so that the mechanic can readily clean the readout surface 18 as well as the control surfaces 24 and 26 should they become contaminated. The liquid level indicator contemplated by the present invention is of extremely simple construction, yet highly efficient when used for its intended purpose. The integral construction of the indicator makes it possible to produce the device by practicing conventional methods of molding of materials compatible with the fuel or liquid utilized in the container.

The invention is claimed as follows:

1. A level indicator for indicating levels of liquid subject to fluctuation within a container comprising a member of light transmitting material presenting a body section including a lower portion immersible within liquid and an upper portion providing an exposed liquid level indicator surface, prismatic surface means associated with the lower body portion for receiving light rays from and reflecting light rays to said level indicating surface, said prismatic surface means includes a plurality of circumferentially disposed, axially and radially separated surface areas inclined at 45° with respect to said upper exposed liquid level indicating surface, each of said surface areas being radially separated from the next adjacent surface area by an annular planar surface which is substantially parallel with said indicating surface, said prismatic surface means being so disposed with respect to said level indicating surface as to receive and reflect light on only the portion of the prismatic surface means located above an associated body of liquid, and abutment means extending between the lowermost limit of said prismatic surface means and a complementary interior surface area of an associated container, said abutment means providing a positive spacing means and a restricted surface area at its juncture with said prismatic surface means to counteract impairment of readout conditions on the indicating surface which might otherwise result from surface tension of the contained liquid.

2. A level indicator for indicating levels of liquid subject to fluctuation within a container as set forth in claim 1, wherein the surface areas include a frusto-conical configuration having an included angle of 90°.

3. A level indicator for indicating levels of liquid subject to fluctuation within a container as set forth in claim 1, wherein the abutment means extends beyond the lowermost limit of the prismatic surface means and is substantially circular in transverse cross-section and terminates in a lower restricted flat surface area substantially parallel with said indicating surface for contacting a complementary interior surface area of an associated container.

4. A level indicator for indicating levels of liquid subject to fluctuation within a container as set forth in claim 1, wherein the abutment means comprises an integral substantially cylindrical element extending co-axially from and beyond the prismatic surface means.

5. A level indicator for indicating levels of liquid as set forth in claim 1, wherein the body section comprises a solid, substantially cylindrical member and the abutment means includes an integral member of restricted diameter coaxially disposed with respect to said prismatic surface means and said body section.

6. A level indicator for indicating levels of liquid subject to fluctuation within a container as set forth in claim 1, wherein the prismatic surface means includes a first frusto-conical surface having its maximum diameter terminating in radially spaced relation to the periphery of the body section and a second frusto-conical surface of smaller diameter extending axially beyond and radially inwardly spaced from said first frusto-conical surface, the abutment means including an integral member extending axially beyond said second frusto-conical surface and having a maximum diameter which is not in excess of the minimum diameter of said second frusto-conical surface.

References Cited

UNITED STATES PATENTS

| | | | |
|---|---|---|---|
| 2,301,460 | 11/1942 | Sauer | 73—327 |
| 3,068,697 | 12/1962 | Carlson | 350—96 X |
| 3,122,124 | 2/1964 | Yocum | 116—117 |
| 3,442,127 | 5/1969 | Nichols | 73—327 |
| 3,362,224 | 1/1968 | Melone | 73—327 |

FOREIGN PATENTS 883,068    7/1953    Germany.

OTHER REFERENCES

Publication: "Fluid Level Gauge" by W. Barsties published May 4, 1943.

LOUIS R. PRINCE, Primary Examiner

D. M. YASICH, Assistant Examiner

U. S. Cl. X.R.

116—118